US007386327B2

(12) United States Patent
Ryu et al.

(10) Patent No.: US 7,386,327 B2
(45) Date of Patent: Jun. 10, 2008

(54) APPARATUS AND METHOD FOR CONTROLLING NOISE IN A MOBILE COMMUNICATION TERMINAL

(75) Inventors: Sang-Woo Ryu, Suwon-shi (KR); Jong-Jin Yun, Seoul (KR)

(73) Assignee: Samsung Electronics Co., Ltd. (KR)

( * ) Notice: Subject to any disclaimer, the term of this patent is extended or adjusted under 35 U.S.C. 154(b) by 811 days.

(21) Appl. No.: 10/797,434

(22) Filed: Mar. 10, 2004

(65) Prior Publication Data

US 2005/0021332 A1 Jan. 27, 2005

(30) Foreign Application Priority Data

May 7, 2003 (KR) ............................... 2003-28908

(51) Int. Cl.
*H04B 1/38* (2006.01)
*H04B 15/00* (2006.01)
*H04M 1/00* (2006.01)
*G10L 11/06* (2006.01)
*G10L 15/20* (2006.01)

(52) U.S. Cl. ...................... 455/570; 455/222; 455/223; 704/226; 704/233

(58) Field of Classification Search ................ 455/570, 455/63.1, 296, 67.13, 114.2, 222, 223, 212, 455/174.1, 194.1, 218–221; 379/392.01; 381/92.2–94.9; 204/203–204, 226, 269; 704/203–204, 226–227, 268–269, 233

See application file for complete search history.

(56) References Cited

U.S. PATENT DOCUMENTS 5,839,101 A * 11/1998 Vahatalo et al. ............ 704/226
6,385,578 B1 5/2002 Lee et al.
6,810,273 B1 * 10/2004 Mattila et al. .............. 455/570
7,171,246 B2 * 1/2007 Mattila et al. .............. 455/570
7,174,291 B2 * 2/2007 McArthur et al. .......... 704/224
7,245,878 B2 * 7/2007 Lin et al. ................... 455/63.1
2002/0120439 A1 8/2002 Mekuria et al.

FOREIGN PATENT DOCUMENTS

WO WO 01/37265 5/2001

* cited by examiner

*Primary Examiner*—Pablo N. Tran
(74) *Attorney, Agent, or Firm*—The Farrell Law Firm, PC

(57) ABSTRACT

An apparatus and method for controlling a volume of comfort noise in a mobile communication terminal. The mobile communication terminal includes a vocoder for detecting a decoding rate of voice data received after establishing a voice call to output a detection signal and an amplifier for amplifying an output signal of the vocoder. The method comprises the steps of determining whether the decoding rate of the voice data from the vocoder is ⅛, recognizing the voice data as silence period data containing only the comfort noise and providing the vocoder with a control signal to lower a volume of the comfort noise, if the decoding rate of the voice data is ⅛, and controlling a volume of the voice data such that it becomes a volume preset by a user, if the decoding rate of the voice data is not ⅛.

10 Claims, 6 Drawing Sheets

APPARATUS AND METHOD FOR CONTROLLING NOISE IN A MOBILE COMMUNICATION TERMINAL

PRIORITY

This application claims priority to an application entitled "APPARATUS AND METHOD FOR CONTROLLING NOISE IN MOBILE COMMUNICATION TERMINAL", filed in the Korean Industrial Property Office on May 7, 2003 and assigned Serial No. 2003-28908, the contents of which are hereby incorporated by reference.

BACKGROUND OF THE INVENTION

1. Field of the Invention

The present invention relates generally to an apparatus and method for controlling noise in a mobile communication terminal, and more particularly to an apparatus and method for controlling a volume of comfort noise received in a silence period during a call connection state of a mobile communication terminal.

2. Description of the Related Art

Generally, while a user of a calling mobile communication terminal, namely, a calling user, is in a call connection state with a user of a called mobile communication terminal, namely, a called user, there may be a silent period during which the calling user does not talk to the called user. Such a period is typically referred to as a silence period. In this silence period, no voice signal containing the calling user's voice, but a noise signal containing only ambient noise, i.e., noise around the calling mobile communication terminal, is transmitted to a vocoder of the called mobile communication terminal. The vocoder may be generally of an EVRC (Enhanced Variable Rate Speech Codec) type or a QCELP (Qualcomm Code Excited Linear Predictive) type. The EVRC-type vocoder is employed in a CDMA (Code Division Multiple Access)-type mobile telephone service and codes voice information at variable rates based on the amount thereof. In a similar way to the EVRC-type vocoder, the QCELP-type vocoder codes voice information at variable rates based on the amount thereof. That is, in a speech period where a speaking user talks a lot, voice information is coded at a high rate because the amount of voice information is large. On the other hand, in the silence period where the speaking user does not talk, voice information is coded at a low rate since the amount of voice information is close to zero.

As described above, in the silence period, a conventional mobile communication terminal transmits data at a rate different from that in the speech period in the QCELP or EVRC manner. That is, in the silence period, the vocoder of the calling mobile communication terminal compresses data containing only ambient noise so that the amount thereof becomes ⅛ that of information in the speech period, and transmits the resulting ⅛-rate data to the called mobile communication terminal. The vocoder of the called mobile communication terminal receives the ⅛-rate data and reproduces only noise of a certain level in the received data, enabling the called user to hear the noise. The noise reproduced in the silence period is typically referred to as comfort noise, which is intrinsic to a vocoder, such as the EVRC-type or QCELP-type vocoder. The comfort noise provides the called user with a more comfortable conversation environment. Without the comfort noise, the called user may not hear any sound from the calling user in the silence period, therefore the called user may think that the current call has been disconnected or feel as if he/she is in a sound-free room where no ambient noise exists. The comfort noise is not noise typically produced by hardware (H/W) circuitry, but rather intentionally provided. In this regard, the comfort noise is different from any other noise, such as extraneous noise produced in the speech period, which should be completely removed. Conventionally, because the receiving volume of a mobile communication terminal is set to a low level, the comfort noise is reproduced at such a low volume that it is unable to be recognized as typical noise by a user. However, as the standard level of the receiving volume has increased significantly according to users' demands and market trends, recently, the receiving volume has been set to a higher level. Accordingly, the volume of the comfort noise in the silence period has been raised with the receiving volume of voice data in the speech period in the call connection state.

FIG. 1 illustrates a conventional apparatus for receiving and outputting a voice signal in a mobile communication terminal. As illustrated in FIG. 1, a radio frequency (RF) unit 102 is provided to receive voice data, which is then processed via a vocoder 104, an internal codec 106, and an external codec 110 such that it is output at a receiving volume set by a user. It can be seen from this construction that the receiving volume of the voice data is amplified to a high level set to meet the current demand for the high receiving volume standard level. However, the comfort noise, generated in the silence period in the call connection state, is over-amplified, thereby providing its intrinsic function, but also causing white noise that results in the user's dissatisfaction. In this regard, there is an increased need to prevent the over-amplification of the comfort noise in the silence period after establishment of a call in the mobile communication terminal.

As described above, in the past, because the standard level of the receiving volume of a mobile communication terminal had been set to a low level, the comfort noise received in the silence period was reproduced at such a low volume as not to be recognized as typical noise by a user. However, recently, because the receiving volume has been significantly raised in compliance with users' demands and market trends, not only has the receiving volume been raised, but also the output volume of the comfort noise in the silence period has been increased to such a level as to cause the users' dissatisfaction. For this reason, the comfort noise has caused white noise in addition to the provision of its intrinsic function. Therefore, a need exists to reduce the level of white noise by controlling the volume of the comfort noise received in the silence period in the call connection state.

SUMMARY OF THE INVENTION

The present invention has been designed in view of the above and other problems, and it is an object of the present invention to provide an apparatus and method for reducing white noise resulting from comfort noise produced in a silence period during a call connection state of a mobile communication terminal.

It is another object of the present invention to provide an apparatus and method for controlling a volume of comfort noise produced in a silence period during a call connection state of a mobile communication terminal.

In accordance with an aspect of the present invention, the above and other objects can be accomplished by an apparatus for controlling comfort noise in a called mobile communication terminal, the called mobile communication terminal establishing a voice call with a calling mobile communication terminal to receive voice data therefrom, the apparatus comprising: a voice coder for receiving the voice data, detecting a decoding rate of the received voice data to output a data decoding rate detection signal, and outputting the voice data at a low volume in response to a control signal to lower a volume of the comfort noise; an amplifier for lowering and amplifying a volume of the voice data to a level corresponding to the control signal, and outputting the voice data at the resulting volume; and a controller for receiving the data decoding rate detection signal, and when the detection signal represents that the decoding rate is ⅛, recognizing the voice data as silence period data and providing the voice coder and the amplifier with the control signal.

In accordance with another aspect of the present invention, there is provided a method for controlling comfort noise received during a call connection state of a mobile communication terminal, the mobile communication terminal including a voice decoder for receiving voice data and detecting a decoding rate of the voice data, and an amplifier for amplifying an output signal of the voice decoder, the method comprising the steps of: determining whether the decoding rate of the voice data output from the voice decoder is ⅛; and, when the decoding rate of the voice data is ⅛, recognizing the voice data as silence period data containing only the comfort noise and providing the voice decoder with a control signal to lower the volume of the comfort noise.

BRIEF DESCRIPTION OF THE DRAWINGS

The above and other objects, features, and other advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the annexed drawings. In the following description, a detailed description of known functions and configurations incorporated herein will be omitted when it may make the subject matter of the present invention rather unclear. In this regard, the following description will be directed to a preferred embodiment of the present invention for controlling comfort noise produced in a silence period during a call connection state of a mobile communication terminal to lower the volume thereof.

Figure 1:
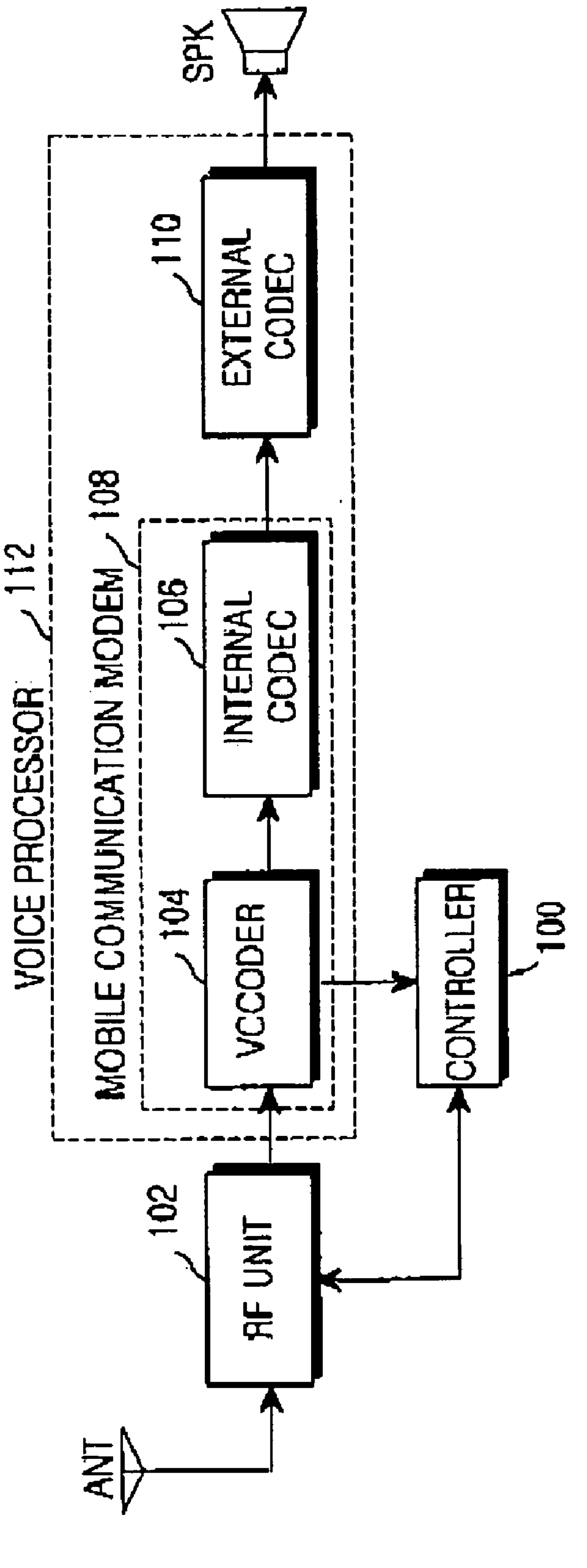
FIG. 1 (PRIOR ART)
FIG. 1 is a block diagram illustrating a conventional apparatus for receiving and outputting a voice signal in a mobile communication terminal.
Figure 2:
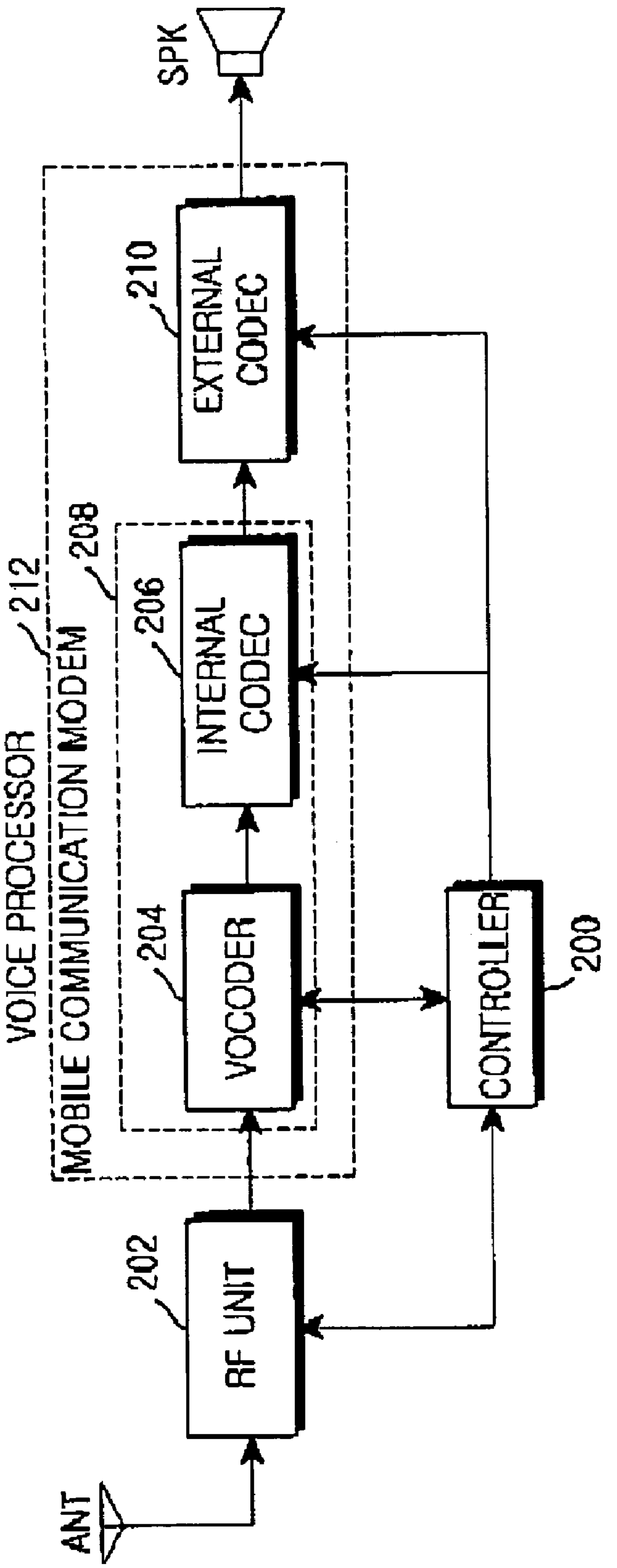
FIG. 2 is a block diagram illustrating an apparatus for controlling comfort noise in a silence period during a call connection state of a mobile communication terminal according to a preferred embodiment of the present invention.

FIG. 2 is a block diagram illustrating an apparatus for controlling comfort noise in a silence period during a call connection state of a mobile communication terminal according to a preferred embodiment of the present invention. As illustrated in FIG. 2, the comfort noise control apparatus includes an antenna ANT, a radio frequency (RF) unit 202, a voice processor 212, and a speaker SPK. The voice processor 212 includes a mobile communication modem 208 consisting of a vocoder 204 and an internal codec 206. Additionally, the voice processor 212 includes an external codec 210. The RF unit 202 is operated under the control of a controller 200 to receive an RF signal via the antenna ANT and to down-convert the frequency of the received RF signal. The RF unit 202 then determines the data type of the down-converted signal and provides output data to the controller 200 or voice processor 212 according to the determination result. The output data from the RF unit 202 provided to the controller 200 is character data, or signaling data and paging signal data received over a paging channel. The output data from the RF unit 202 provided to the voice processor 212 is voice data received when a voice call is established. Because the present apparatus is proposed to control the volume of voice data received in a call connection state, i.e., after a voice call is established, the latter case, i.e., providing the voice processor 212 with the voice data received by the RF unit 202, is considered in this embodiment.

Additionally, the RF unit 202 receives data from the controller 200 or coded voice data from the voice processor 212, up-converts the frequency of the received data, and transmits the resulting RF signal via the antenna ANT. The controller 200 controls the overall operation of the mobile communication terminal. Particularly in this embodiment, the controller 200 controls the comfort noise produced in the silence period during the call connection state to lower the volume thereof.

Figure 3:
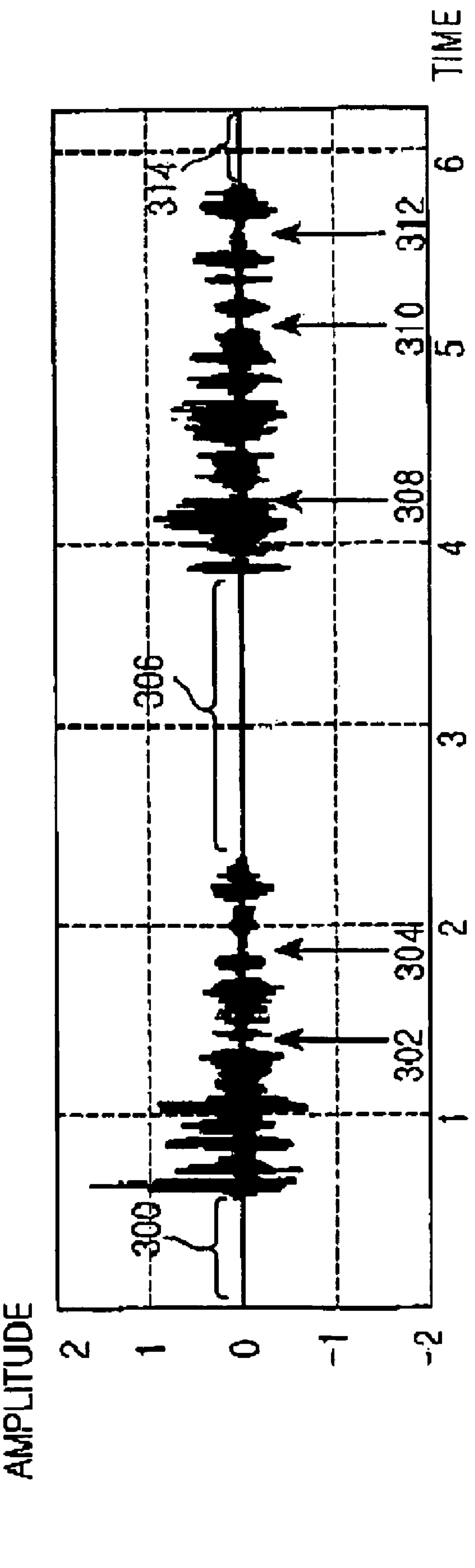
FIG. 3 is a waveform diagram illustrating volume variations in a voice signal period according to the embodiment of the present invention.

Referring to FIG. 3, an entire period of a voice signal consists of speech periods and silence periods 300, 302, 304, 306, 308, 310, 312, and 314, each of which is interposed between respective speech periods and contains no voice and only comfort noise. According to the present invention, the comfort noise produced in each silence period is controlled so that it is reproduced at a low volume. The controller 200 receives a data decoding rate detection signal from the vocoder 204. When the data decoding rate detection signal represents that the decoding rate is ⅛, for example, the controller 200 recognizes that the output data from the RF unit 202 contains the comfort noise only. Then the controller 200 provides the vocoder 204, the internal codec 206, and the external codec 210 with a control signal to lower the volume of the comfort noise. In response to the control signal from the controller 200, the comfort noise is reproduced at such a low volume that a user does not recognize it as white noise.

When the data decoding rate detection signal provided from the vocoder 204 represents that the decoding rate is not ⅛, i.e., does not contain only comfort noise, the controller 200 controls the volume of the output data from the RF unit 202 such that it becomes a receiving volume preset by the user. That is, the controller 200 controls the volume of the voice signal to reproduce voice in the speech period at the receiving volume preset by the user and to reproduce the comfort noise in the silence period at such a low volume that the user does not recognize it as white noise. To this end, the controller 200 provides the vocoder 204, the internal codec 206, and the external codec 210 of the voice processor 212 with a control signal to control the volume of the comfort noise. The voice processor 212, which receives the control signal to control the volume of the comfort noise, generally includes the vocoder 204, the internal codec 206, and the external codec 210, as described above. The vocoder 204 demodulates a coded voice signal provided from the RF unit 202 to an electrical signal. The demodulated voice signal is amplified via the internal codec 206 and the external codec 210 and then reproduced in audible sound via the speaker SPK. The vocoder 204 converts the voice signal from an analog format to a digital format. That is, the vocoder 204 extracts only a voice signal from data of 64 kbps produced through PCM (Pulse Code Modulation) and converts the extracted voice signal to have any one of four data rates of 8.6 kbps, 4.0 kbps, 2.0 kbps, and 0.8 kbps.

When received voice data is large in amount, it is converted to have the data rate of 8.6 kbps, and, when the received voice data is small in amount, either the 2.0 kbps or 0.8 kbps data rate is used. Because a high data rate is used when the received voice data is large in amount and a low data rate when the received voice data is small in amount, the vocoder varies the data rate with the amount of the data for effective frequency utilization.

In this embodiment, it is assumed that the vocoder 204 is of an EVRC type or QCELP type. In the silence period where no user's voice, but only noise of a certain level is provided, the EVRC-type or QCELP-type vocoder compresses data containing only ambient noise so that the amount thereof becomes ⅛ that of information in the speech period and transmits the resulting ⅛-rate data to a counterpart. In this connection, the vocoder 204 provides the controller 200 with a detection signal about the compression rate, i.e., the decoding rate of the received data, and receives the control signal to control the volume of the comfort noise from the controller 200. In response to the control signal, the vocoder 204 lowers the volume of the comfort noise to reproduce the comfort noise at a low volume via the internal codec 206, external codec 210, and the speaker SPK.

Alternatively, the volume of the comfort noise may be lowered by the internal codec 206 or the external codec 210 in response to the control signal received from the controller 200. However, adjusting the volume via the vocoder 204 is the fastest way to lower the volume of the comfort noise, since the vocoder 204 detects the ⅛-rate information directly.

Figure 4:
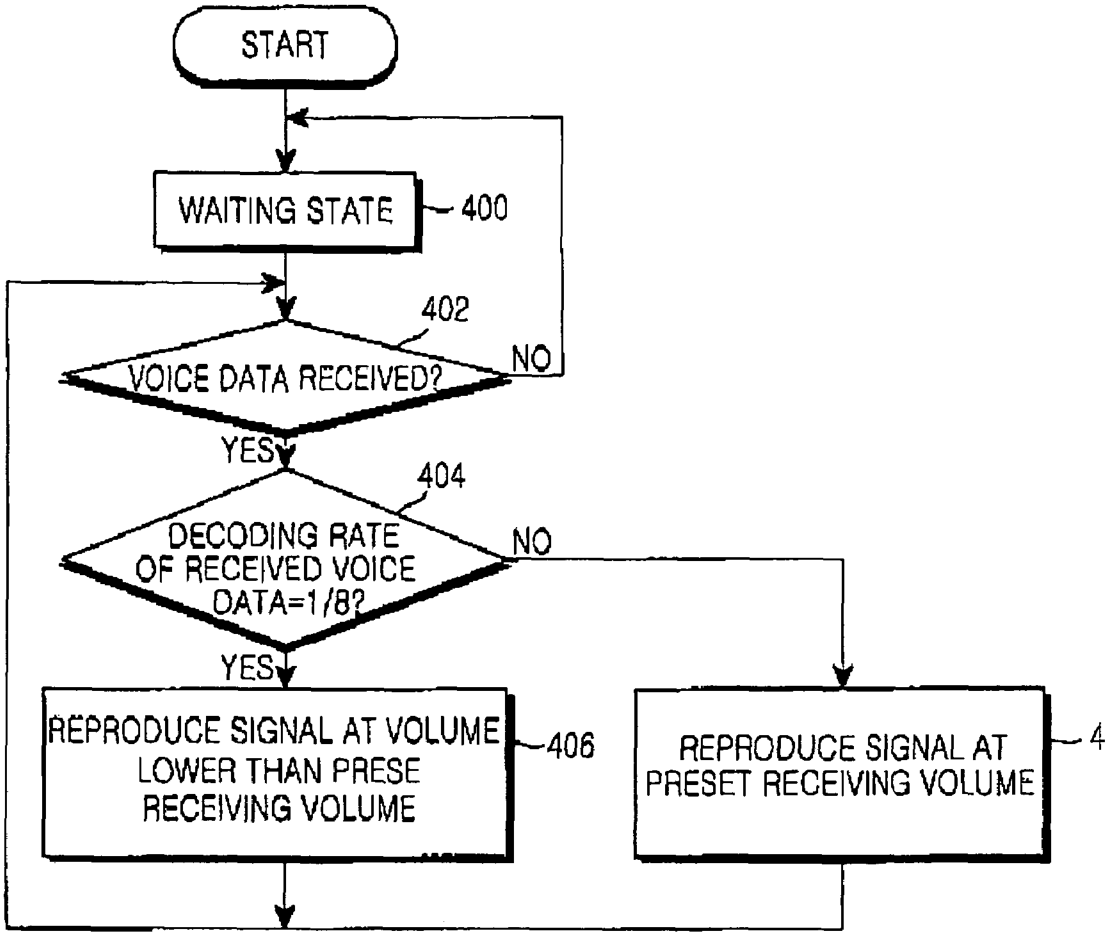
FIG. 4 is a flow chart illustrating a method for controlling the comfort noise in the silence period during the call connection state of the mobile communication terminal according to the embodiment of the present invention.

A method for lowering the volume of the comfort noise produced in the silence period during the call communication state will hereinafter be described in detail with reference to FIG. 4. Because the present method is controls the volume of voice data received by the mobile communication terminal after establishment of a voice call, it is assumed that the voice call has been already established in the mobile communication terminal.

In step 400, the controller 200 of the mobile communication terminal is in a waiting mode. In step 402, the controller 200 determines whether the RF unit 202 receives voice data via the antenna ANT. That is, in step 402, it is determined whether voice data is received after a voice call is established with a counterpart. If the reception of voice data is recognized, the controller 200 determines in step 404 whether the data compression rate, i.e., the data decoding rate, is ⅛ based on the data decoding rate detection signal from the vocoder 204. If the data compression rate is ⅛, the controller 200 recognizes the received voice data as silence period data, which contains only the comfort noise, and controls the volume of the voice data so that the voice data is reproduced at a volume lower than the preset volume.

More specifically, in step 406, the controller 200 receives the data decoding rate detection signal from the vocoder 204, determines whether the decoding rate is ⅛, and recognizes the current period as the silence period if the decoding rate is ⅛. The controller 200 then outputs the control signal to the vocoder 204, the internal codec 206 and the external codec 210 so that the comfort noise is reproduced in the silence period at the volume lower than the preset volume. In response to the control signal, the vocoder 204, the internal codec 206 and the external codec 210 reproduce the comfort noise not at the preset volume, but at the volume corresponding to the control signal. Because the comfort noise is intended to provide the user with a more comfortable conversation environment, it is different from any other noise, which should be completely removed. Accordingly, in this embodiment, the volume of the comfort noise is lowered to and reproduced at such a low level that the user does not recognize the comfort noise as white noise.

However, in step 404, if the data decoding rate detection signal received from the vocoder 204 represents that the decoding rate is not ⅛, i.e., if the current period is the speech period containing ¼-rate or ½-rate voice data, the controller 200 proceeds to step 408. In step 408, the controller 200 controls the volume of the voice data such that it becomes the volume preset by the user. Because sudden variations in volume between different periods of the voice signal are intentionally provided, the quality of sound will be deteriorated. Such an adverse effect can be more serious during repeated short silence periods than during a long silence period. However, the transition from the silence period to the speech period is not sudden, but gradual. That is, the transition from the ⅛ rate to the full rate is not suddenly performed, but gradually performed by way of the data rate of ¼-rate or ½-rate. Because the volume in the ¼ or ½-rate period is basically not high, a variation thereof has no great effect on the ultimate output volume of the speaker SPK.

Figure 5A:
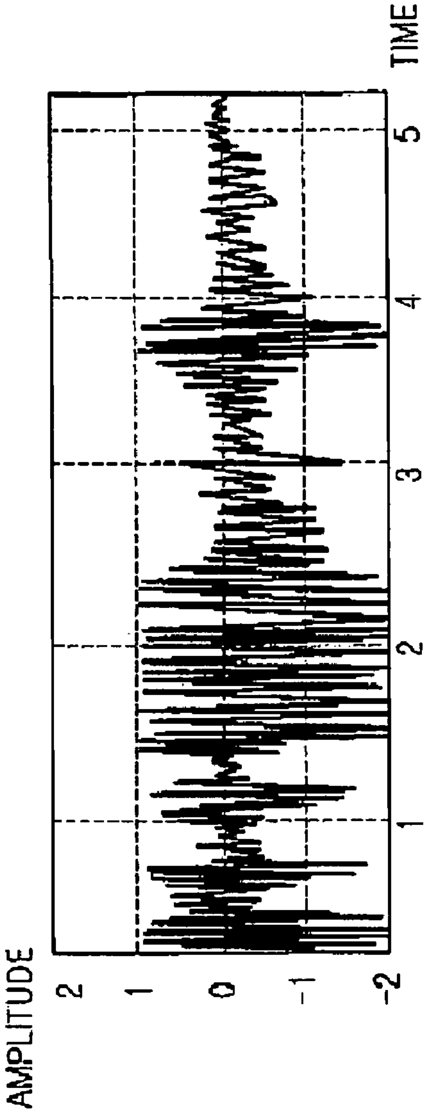
FIGS. 5A to 5D are waveform diagrams illustrating reductions in volume of the comfort noise in the silence period during the call connection state of the mobile communication terminal according to the embodiment of the present invention.
Figure 5B:
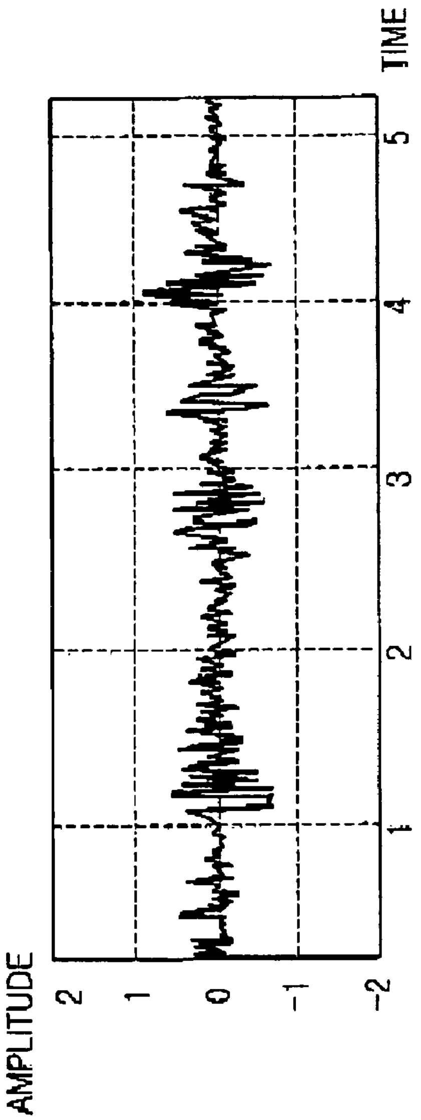
Figure 5C:
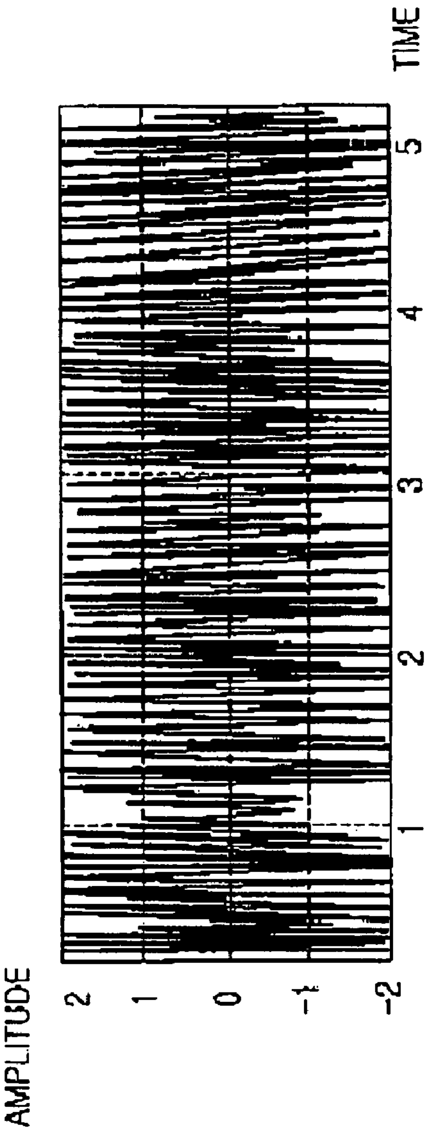
Figure 5D:
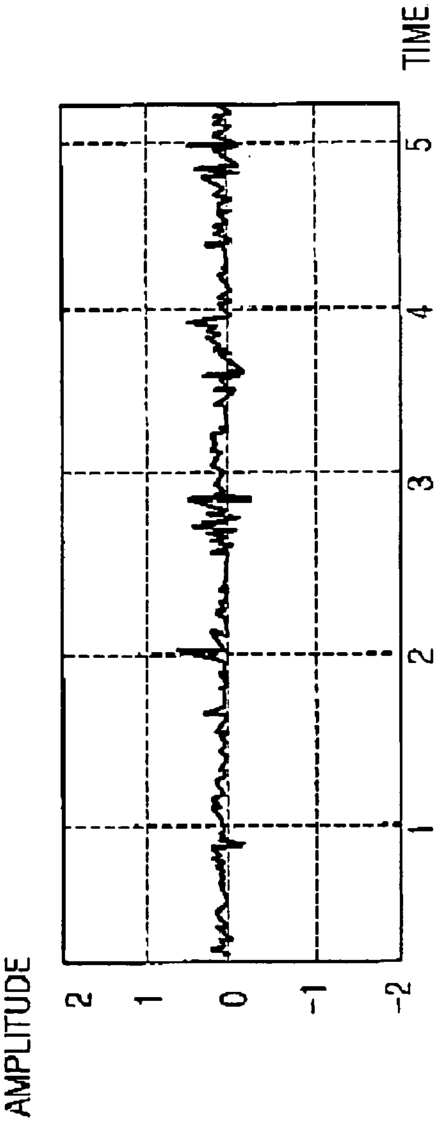

FIGS. 5A to 5D illustrate reductions in a volume of the comfort noise in the silence period during the call connection state of the mobile communication terminal according to the present invention. The degrees of over-amplification of the comfort noise in the silence period during the call connection state as illustrates in FIGS. 5A and 5C are corrected to those illustrated in FIGS. 5B and 5D, respectively.

As is apparent from the description above, according to the present invention, the white noise resulting from over-amplification of the comfort noise caused by the raised receiving volume standard level can be effectively prevented by lowering a volume of the comfort noise in the silence period.

As described above, according to the present invention, the white noise resulting from the increased volume of the comfort noise caused by the raised receiving volume standard level can be reduced to such a low level that the user does not recognize the comfort noise as the white noise. Therefore, the present invention has an advantage in that the white noise caused by over-amplification of the comfort noise can be effectively prevented.

Although the preferred embodiments of the present invention have been disclosed for illustrative purposes, those skilled in the art will appreciate that various modifications, additions, and substitutions are possible, without departing from the scope and spirit of the invention as disclosed in the accompanying claims. For example, although the controller controls the vocoder, the internal codec, and the external codec of the voice processor in the preferred embodiment of the present invention, it may control any one of them.

What is claimed is:

1. An apparatus for controlling a volume of noise in a mobile communication terminal, the mobile communication terminal establishing a voice call with a second mobile communication terminal to decode voice data received therefrom, the apparatus comprising:

a voice processor for decoding the received voice data according to a coding rate of the second mobile communication terminal and outputting the decoded voice signal at a volume variable under an external control; and a controller for setting the output volume of the voice processor to a receiving volume preset by a user, receiving information about a decoding rate corresponding to the coding rate of the voice data from the voice processor, controlling the output volume of the voice processor according to the received information, and lowering the output volume of the voice processor in a silence period to such a volume that the user does not recognize the noise as white noise.

2. The apparatus as set forth in claim 1, wherein the controller receives the information about the decoding rate corresponding to the coding rate of the voice data from the voice processor, and, if the received information represents that the voice data belongs to a speech period, controls the output volume of the voice processor such that it becomes the receiving volume preset by the user.

3. An apparatus for controlling a volume of noise in a mobile communication terminal, the mobile communication terminal establishing a voice call with a second mobile communication terminal to decode voice data therefrom, the apparatus comprising:

a vocoder for decoding received voice data according to a coding rate of the second mobile communication terminal and outputting the decoded voice signal at a volume variable under an external control;

an amplifier for amplifying the output voice data of the vocoder; and a controller for setting the output volume of the vocoder to a receiving volume preset by a user, receiving information about a decoding rate according to the coding rate of the voice data from the vocoder, controlling the output volume of the vocoder according to the received information, and lowering the output volume of the voice processor in a silence period to such a volume that the user does not recognize the noise as white noise.

4. An apparatus for controlling a volume of noise in a mobile communication terminal, the mobile communication terminal establishing a voice call with a second mobile communication terminal to decode voice data received therefrom, the apparatus comprising:

a vocoder for decoding the received voice data according to a coding rate of the second mobile communication terminal and outputting the decoded voice signal at a volume variable under an external control;

an amplifier for varying an amplification degree under the external control and outputting the voice signal from the vocoder at a volume corresponding to the varied amplification degree; and a controller for setting the output volume of the vocoder to a receiving volume preset by a user, receiving information about a decoding rate according to the coding rate of the voice data from the vocoder, controlling the output volumes of the vocoder and the amplifier according to the received information, and lowering the output volume of the voice processor in a silence period to such a volume that the user does not recognize the noise as white noise.

5. The apparatus as set forth in claim 4, wherein the amplifier includes an internal codec and an external codec.

6. The apparatus as set forth in claim 4, wherein the controller receives the information about the decoding rate according to the coding rate of the voice data from the vocoder, and, if the received information represents that the voice data belongs to a speech period, controls the output volume of the vocoder such that it becomes the receiving volume preset by the user.

7. A method for controlling a volume of noise in a mobile communication terminal, the mobile communication terminal including a vocoder for detecting a decoding rate of voice data received after establishing a voice call and outputting a decoding rate detection signal, and an amplifier for amplifying an output signal from the vocoder, the method comprising the steps of:

a) determining whether the decoding rate detection signal from the vocoder indicates that the decoding rate of the voice data is a predetermined rate;

b) outputting a volume control signal to the vocoder if the decoding rate of the voice data is the predetermined rate; and c) providing a control signal to lower the volume of the noise to the amplifier to lower the volume of the noise to such a level that the user does not recognize the noise as white noise.

8. The method as set forth in claim 7, further comprising the step of controlling a volume of the voice data such that it becomes a receiving volume preset by a user if the decoding rate of the voice data is not the predetermined rate.

9. The method as set forth in claim 7, further comprising the step of recognizing the voice data as silence period data containing only the noise if the decoding rate is the predetermined rate, and providing the amplifier with the control signal to lower the volume of the noise.

10. The method as set forth in claim 7, wherein the predetermined rate is ⅛.

* * * * *